United States Patent
Keslin et al.

(10) Patent No.: US 10,698,485 B2
(45) Date of Patent: Jun. 30, 2020

(54) AUGMENTING TEXT NARRATION WITH HAPTIC FEEDBACK

(71) Applicant: Microsoft Technology Licensing, LLC., Redmond, WA (US)

(72) Inventors: Jonathan Fred Keslin, Kirkland, WA (US); Michelle Elena Keslin, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 440 days.

(21) Appl. No.: 15/193,313

(22) Filed: Jun. 27, 2016

(65) Prior Publication Data

US 2017/0371414 A1    Dec. 28, 2017

(51) Int. Cl.
*G06F 3/01*   (2006.01)
*G06F 3/16*   (2006.01)
(Continued)

(52) U.S. Cl.
CPC .............. *G06F 3/016* (2013.01); *G06F 3/167* (2013.01); *G06F 40/134* (2020.01); *G06F 40/166* (2020.01)

(58) Field of Classification Search
CPC .................................. G10L 13/00; G06F 3/016
See application file for complete search history.

(56) References Cited

U.S. PATENT DOCUMENTS 7,457,397 B1 * 11/2008 Saylor ................ H04M 3/4938
                                                         379/88.17
7,783,644 B1 *  8/2010 Petrou ............... G06F 17/30864
                                                         707/748
(Continued)

FOREIGN PATENT DOCUMENTS

EP    2846226 A2    3/2015
WO    9943111 A1    8/1999

OTHER PUBLICATIONS

"International Search Report and Written Opinion Issued in PCT Application No. PCT/US2017/038409", dated Aug. 14, 2017, 13 Pages.

(Continued)

*Primary Examiner* — Li P Sun
*Assistant Examiner* — Qi Wan
(74) *Attorney, Agent, or Firm* — Merchant & Gould

(57) ABSTRACT

Haptic feedback for communication of relevant information is provided. Oftentimes when using content narration to read or author a document, it is desirable to notify the user of a presence of meta-information. Aspects of a haptic feedback system avoid adding data to an audio stream, and instead, use haptic feedback technology to communicate information about a presence and type of meta-information in relation to content being narrated. Device functionality can be improved by enabling communication of relevant information through non-auditory cues that are consumable by sight-impaired users. By employing haptic technologies as described herein, users are enabled to feel when certain meta-information is available, and are further enabled to interact with the meta-information to receive additional information associated with the meta-information.

17 Claims, 10 Drawing Sheets

(51) Int. Cl.
*G06F 40/134* (2020.01)
*G06F 40/166* (2020.01)

(56) References Cited

U.S. PATENT DOCUMENTS

| | | | |
|---|---|---|---|
| 8,352,269 B2 | 1/2013 | Kurzweil et al. | |
| 8,378,979 B2 | 2/2013 | Frid et al. | |
| 8,452,600 B2 | 5/2013 | Fleizach | |
| 2005/0081165 A1* | 4/2005 | Sobeski | G06F 9/451 715/848 |
| 2005/0193335 A1* | 9/2005 | Dorai | G06F 17/30893 715/234 |
| 2006/0187215 A1* | 8/2006 | Rosenberg | A63F 13/06 345/173 |
| 2009/0096632 A1* | 4/2009 | Ullrich | H04N 9/8205 340/4.21 |
| 2009/0219252 A1* | 9/2009 | Jarventie | G06F 3/016 345/173 |
| 2009/0254345 A1* | 10/2009 | Fleizach | G10L 13/043 704/260 |
| 2010/0030752 A1* | 2/2010 | Goldentouch | G06F 17/30911 707/797 |
| 2010/0188327 A1* | 7/2010 | Frid | G06F 3/016 345/156 |
| 2013/0063494 A1 | 3/2013 | Kirschner et al. | |
| 2013/0307786 A1* | 11/2013 | Heubel | G06F 3/016 345/173 |
| 2014/0184384 A1 | 7/2014 | Zhu et al. | |
| 2014/0307040 A1* | 10/2014 | Choi | H04W 4/046 348/14.01 |
| 2014/0372852 A1* | 12/2014 | Rothschiller | G06F 17/246 715/212 |
| 2014/0377722 A1 | 12/2014 | Reid et al. | |

OTHER PUBLICATIONS

"Enabling Technology", Published on: May 7, 2003, Available at: https://wwwx.cs.unc.edu/Research/assist/et/tree/DisabilitiesVisual.shtml.

Sutton, Jennifer, "A Guide to Making Documents Accessible to People Who Are Blind or Visually Impaired", In Publication of American Council of the Blind, Feb. 2014, 40 pages.

"BARD Mobile Application User Guide", Published on: Apr. 14, 2015, Available at: https://nlsbard.loc.gov/apidocs/BARDMobile.userguide.iOS.current.html.

* cited by examiner

FIG. 2

AUGMENTING TEXT NARRATION WITH HAPTIC FEEDBACK

BACKGROUND

Computing devices are designed to communicate with their users. Historically, this communication has been provided by a visual and audible presentation of information, such as via a screen or a speaker. When a need arises to capture the attention of a computing device user, for example, to alert the user of information that is relevant to the user at a given time, typical methods to grab the user's attention include visual alerts, such as pop-up notifications displayed on a screen, or audible signals, such as beeps, bells, or spoken announcements played through the device's speaker.

Computing device users are increasingly using text narration for a variety of tasks. For example, users with vision impairments may use assistive technology, such as a screen reader to narrate or echo textual content. As another example, mobile users may use text narration in situations where looking at a screen is not desirable, such as when driving a car or engaging in another activity.

While visual or audible notifications are effective in many applications, there are many other applications where visual or audible notifications may be impractical or distracting to the user. Providing visual or audible notifications when it is impractical or distracting to the user degrades the user's experience with the device, and can result in a user experiencing reduced functionality of the device. For example, oftentimes, it is desirable to notify a content narration user of meta-information in a document, wherein meta-information includes information that is related to content that is being narrated, but that is not directly part of content (e.g., co-author presence, hyperlinks, footnotes, endnotes, cross-references, comments, formatting, tracked changes, spelling or grammatical errors, contextual information). However, visual notifications may be impractical or ineffective, such as with visually-impaired users. Further, adding audible content to audio output, such as by narrating meta-information or playing audible alerts, can be disruptive or overwhelming to the user. For example, the users may lose their trains of thought or may not be able to clearly hear the narrated content.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage device for improving usability of a content narration device by providing haptic feedback for communication of relevant information. For example, device functionality can be improved by enabling communication of relevant information through non-auditory cues that are consumable by sight-impaired users. By employing haptic technologies, users are enabled to feel when certain meta-information is available, and are further enabled to interact with the meta-information as desired, for example, to receive additional information associated with the meta-information.

In some examples, haptic feedback is used for notifying a user of content narration of a presence of meta-information, wherein meta-information is related to the content being narrated but that is not directly part of the content being narrated. For example, haptic output is transmitted to alert the user of the presence of such meta-information as: co-author presence, hyperlinks, footnotes, endnotes, cross-references, comments, formatting, tracked changes, spelling or grammar errors, and contextual information. Further, characteristics of the haptic output are varied to provide unique haptic outputs for different types of meta-information. Accordingly, the user is enabled to not only be alerted of a presence of meta-information while consuming narrated content, but is also unobtrusively informed of a corresponding type of meta-information that is present. Having this additional information provided to the user in an unobtrusive manner can help the user in making a decision on whether to request additional information on a piece of meta-information. Accordingly, users are ultimately enabled to request and receive incrementally increasing amounts of additional information associated with narrated content for which meta-information is provided.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2 is an illustration of an example document including meta-information for which a haptic feedback system is operative to provide a corresponding haptic output;

DETAILED DESCRIPTION

Figure 1:
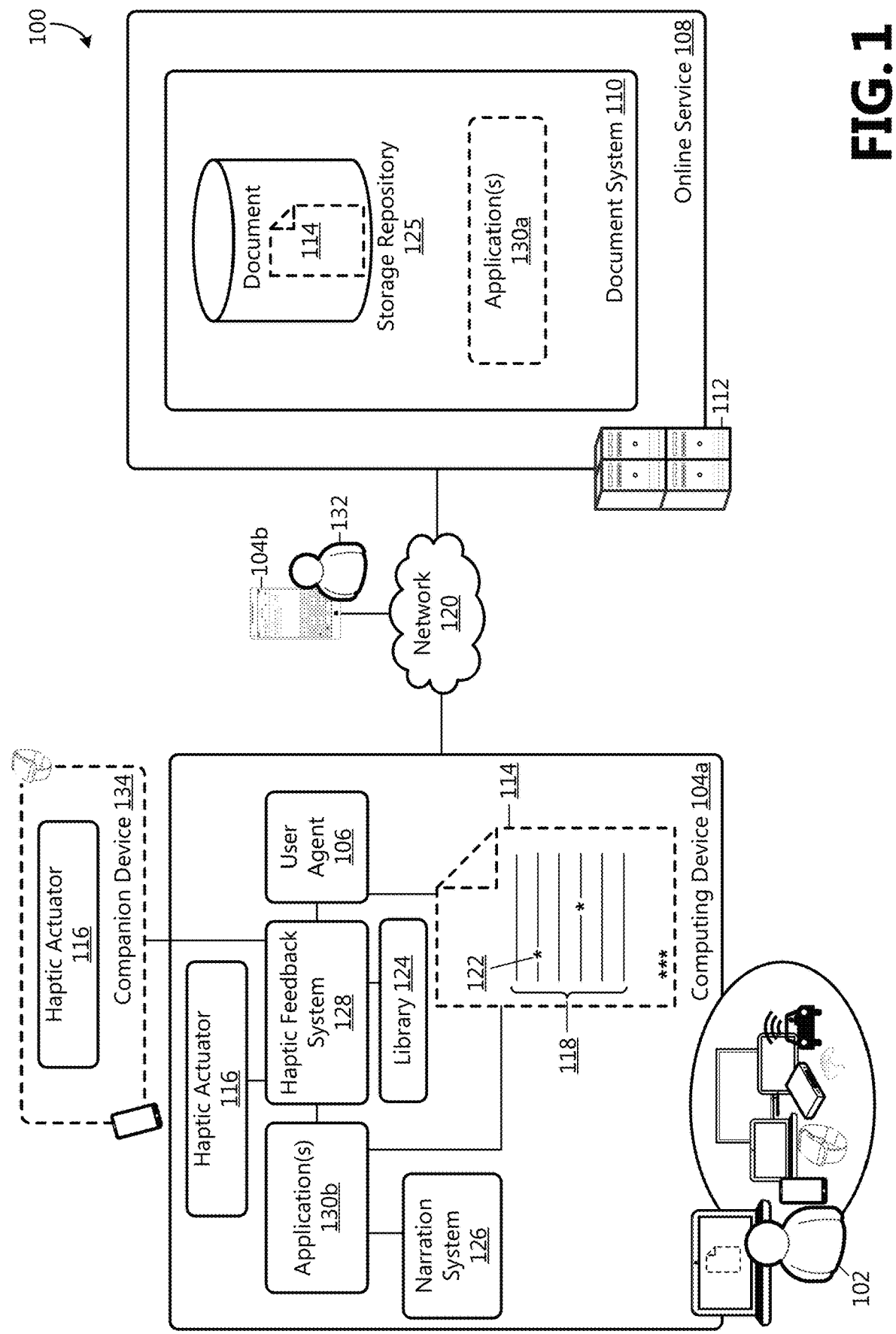
FIG. 1 is a block diagram showing components of an example system for providing haptic feedback for communication of relevant information.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to methods, systems, and computer storage media for improving usability of a text narration device by providing haptic feedback for communication of relevant information. Among other benefits, the disclosed technology enables users to continue with their workflow of consuming narrated content, while receiving non-auditory communication of relevant meta-information related to the narrated content. Further, the communication of relevant meta-information is provided as a distinctive haptic output that corresponds to a specific type of meta-information, therefore providing an unobtrusive communication of information about the meta-information. The user is enabled to request and receive additional information about the meta-information, and in some examples, is enabled to take action on the meta-information based on the additional information.

With reference now to FIG. 1, a block diagram illustrating aspects of an example haptic feedback operating environment 100 is shown. The example haptic feedback operating environment 100 includes a computing device 104. The computing device 104 may be one of various types of computing devices for executing applications 130a,b (collectively, 130) for performing a variety of tasks. Non-limiting examples of suitable computing devices 104 include desktop computers, laptop computers, tablet computers, laptop/tablet hybrid computing devices, large screen multi-touch displays, mobile phones, personal digital assistants, wearable devices, gaming devices, connected automobiles, and smart appliances.

The haptic feedback operating environment 100 includes one or more applications 130 used to view, generate, and edit electronic documents 114. Examples of suitable applications 130 include, but are not limited to, word processing, spreadsheet, database, slide presentation, electronic mail, drawing, note taking, web browser, media player, and game applications. In some examples, the application(s) 130 are web applications 130a run on a server 112 and provided via an online service 108, wherein the online service 108 is illustrative of portal-based computing system for creating, managing and sharing electronic documents 114. In some examples, the online service 108 is located on a server 112, such as a shared resources server located at an enterprise accessible by various client computing devices 104a,b (collectively, 104). In other examples, the server 112 is a shared resources server remotely located from the various client computing devices 104. According to an aspect, the online service 108 includes a document system 110 operative to provide document storage and/or editing of documents 114. In some examples, the online service 108 enables co-authoring of documents 114, for example, where a plurality of users/co-authors 102,132 are enabled to edit the same document 114 concurrently and remotely. In one example, the document system 110 provides one or more online applications 130a to view, generate, and edit electronic documents 114. According to an aspect, the document system 110 comprises a local or remote storage repository 125 at which the one or more electronic documents 114 are stored.

According to an aspect, web applications 130a communicate via the network 120 with a user agent 106, such as a browser, executing on a client computing device 104. The user agent 106 provides a user interface that allows a user 102 to interact with application content and electronic documents 114 stored in the storage repository 125. The user interface is displayed on a display of the computing device 104 running the user agent 106. In some examples, the user agent 106 is a dedicated client application that provides a user interface and access to electronic documents 114 stored in the storage repository 125. In other examples, the application(s) 130 are local applications 130b stored and executed on the computing device 104, and provide a user interface that allows a user 102 to interact with application content and electronic documents 114 stored locally on the device or in the storage repository 125.

A user 102 may use an application 130 to create a new document 114, or to edit an existing document 114. In examples, the application 130 receives input from the user 102, such as text input, drawing input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 118 being added to the document 114. In some examples, content 118 is added within a document canvas (e.g., a page in a word processing document, a spreadsheet in a spreadsheet document, a slide in a presentation document).

In other examples, a user 102 may use an application 130 to consume content 118 rather than to author or modify content. Additional examples of suitable applications 130 in a haptic feedback operating environment 100 include a book reader application, a video or audio playback application, or a global positioning system (GPS) application, where the user views or listens to content 118 that is part of a document 114 or file (e.g., an electronic book (e-book)) or part of a core interface of a device (e.g., GPS unit). In some examples, the content 118 is textual content, such as document content. In other examples, the content 118 is video or audio content. In other examples, the content 118 is information generated by the application 130, such as directions to a destination along a route. As used herein, the term "document" 114 is used in a broad sense, wherein a document includes a representation of various kinds of information (e.g., a word processing document, a spreadsheet document, a slide presentation document, a notes document, an e-book, an audio file, a video file, a navigation file). Documents 114 in the present disclosure include the examples described above. However, these examples are not limiting, and further examples of documents 114, applications 130, and content 118 are within the scope of the present disclosure.

According to aspects, the haptic feedback operating environment 100 further includes a narration system 126 operative to output audio content associated with a document 114, for example, to narrate or echo content 118. In some examples, the narration system 126 is embodied as an assistive technology application, such as a screen reader, where the narration system narrates or echoes document content 118 as a cursor proceeds through the document 114.

In some examples, the narration system 126 is operative to convert previously written content 118 or content that is being transcribed into an audio output, such as speech (e.g., text-to-speech). In other examples, the narration system 126 is operative to output audio content 118 that is previously recorded, such as an audio book recorded by a voice actor, a podcast file, or other type of audio file, or a video recording. According to an aspect, previously recorded content may be augmented with haptic markers that operate as a signal to a haptic feedback system 128 of an item of interest associated with the haptic marker. Further, in some examples, the narration system 126 is operative to convert information that is generated by the application 130 (e.g., directions to a destination along a route) to audio content, and to output the audio content.

According to an aspect, the haptic feedback operating environment 100 includes a haptic feedback system 128 that is communicatively attached to the application 130b or to the user agent 106 when the application is a web application 130a. For example, the haptic feedback system 128 is illustrative of a software module, system, or device that includes functionality for providing haptic feedback for communication of relevant information to a content narration user 102. In one example, the computing device 104 includes a haptic feedback system application programming interface (API), operative to enable the application 130 to employ haptic feedback for communication of relevant meta-information via stored instructions.

In examples, when the narration system 126 narrates or echoes content 118 as the cursor proceeds through the document 114, the haptic feedback system 128 is operative to detect items of interest. According to an aspect, items of interest include meta-information 122 that is related to content 118 that is being narrated, but that is not directly part of the content 118. For example, meta-information can include such information as: co-author presence, hyperlinks, footnotes, endnotes, cross-references, comments, formatting, tracked changes, spelling or grammatical errors, or contextual information (e.g., map for an address, location of additional content). These examples are not limiting, and further examples of meta-information are within the scope of the present disclosure. As can be appreciated, a detected item of interest is relevant to a current context of content 118 in the document 114 being narrated.

In some examples, documents 114 include markup and content, for example, structured information that comprise content (e.g., text, pictures) and an indication of what role the content plays (e.g., element, entity reference, comment, processing instruction, marked section, or document type declaration). A markup language, such as Extensible Markup Language (XML) is a mechanism to identify structures in a document, wherein an XML specification defines a standard way to add markups to documents. According to an aspect, an item of interest (e.g., a meta-information item 122) includes an anchor in its XML structure indicating that it is something other than textual content. For example, the anchor indicates that a content element is one of: a hyperlink, a footnote, an endnote, a cross-reference, a comment, a formatting element, tracked changes content, a spelling or grammatical error, and contextual information (e.g., a map of an address, location of additional content). It should be understood that XML is but one example markup language and that others such as JavaScript Object Notation (JSON), s-expressions (sexprs), or other alternatives may be used.

In a co-authoring example, a flag is inserted into a document 114 to indicate a presence of another user 132 in a particular area of the document 114. For example, when another user 132 joins a document 114, the other user 132 is added to an editors table, which updates automatically as users join and exit the document. According to an aspect, the flag is associated with the editors table, and provides an indication to the user 102 and to the haptic feedback system 128 as to the presence and position of a co-author in the document 114. In other examples, the haptic feedback system 128 is enabled to be notified of events that occur outside the textual content 118, but that are related to the textual content. For example, the haptic feedback system 128 may receive an event notification associated with an automatic save of the document 114. In another example, the haptic feedback system 128 may receive an event notification of a co-authoring event. In some example, items of interest include haptic markers corresponding to meta-information items 122. For example, the haptic marker may be added to a document 114 to indicate that a particular content element has meta-information items 122 associated with it.

According to an aspect, the discovery of an item of interest operates as a signal to provide haptic feedback to the user 102 for communicating the presence of meta-information items 122 in association with content being narrated to the user 102. In some examples, upon detecting an item of interest, the haptic feedback system 128 is operative to reference a haptic feedback library 124 for picking correct haptic feedback characteristics according to the type of meta-information item 122 identified. For example, various characteristics of haptic feedback notifications may exist, such as outputs that vary in pattern (e.g., two short pulses versus one short and one long pulse), intensity (e.g., light vibration versus a strong vibration), location (e.g., where on the device 104,134 the haptic output is felt, type (e.g., vibration versus a tap), and length (e.g., duration of a vibration or tap). One or more of these characteristics may be altered to ensure that a unique haptic output is communicated to the user 102 that is indicative of a particular type of meta-information item 122. As used herein, the terms "haptic output" and "haptic feedback" are used interchangeably.

Figure 2:
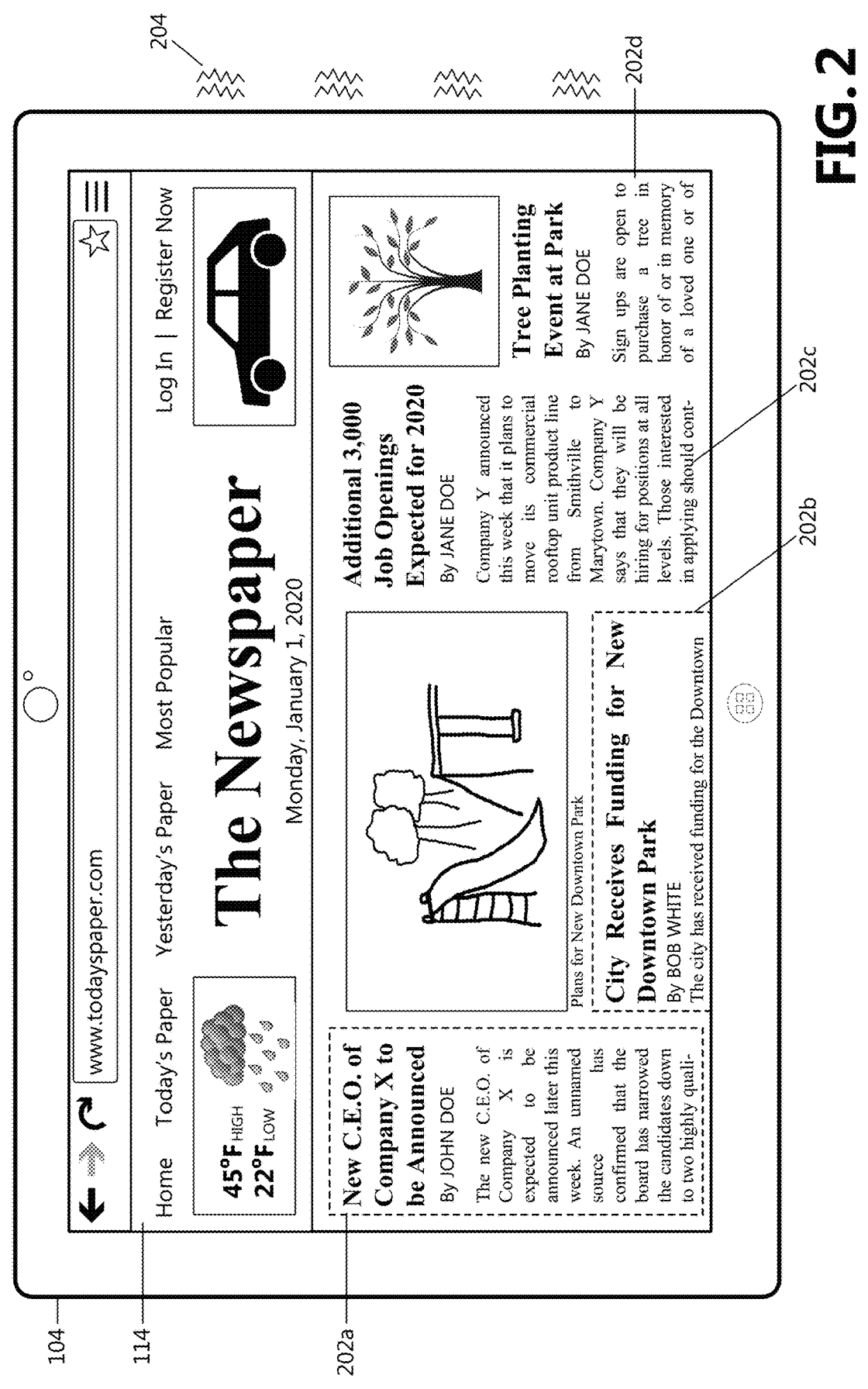

In some examples, haptic output varies in location. For example, haptic output may be directed to a particular location of the computing device 104 or of a companion device 134. According to an example, in a document 114 with a complex layout, such as one that comprises multiple blocks of text that may be laid out in a grid or other format, haptic feedback may be used to provide an indication of additional content or actions that are available in the document and the location of the content or actions that the user 102 can navigate to after reading a given block of text. With reference to FIG. 2, an example document 114 comprising multiple blocks of text 202a,b,c,d is shown displayed on a tablet computing device 104. According to an example, the user 102 uses a narration system 126 to narrate the document 114. When the narration system 126 narrates the first block of text 202a, a cursor proceeds through the content in first block of text 202a until an item of interest is detected by the haptic feedback system 128, such as an end of the block of text. Accordingly, the haptic feedback system 128 is operative to trigger a haptic actuator 116 to generate haptic output 204 associated with the item of interest. In this example, the haptic feedback 204 is provided to alert the user 102 of a location of a next available block of text 202b. For example, the haptic feedback system 128 may direct the haptic actuator 116 to generate haptic output 204 in a location on the device 104 relative to a general direction of the additional content (e.g., next block of text 202b) to indicate to the user in which direction in the document 114 additional content is available to navigate.

With reference again to FIG. 1, the haptic feedback system 128 is communicatively attached to a haptic actuator 116. In some examples, the haptic actuator 116 is stored and executed locally on the computing device 104. In other examples, the haptic actuator 116 is located in a companion device 134, such as a smart watch, fitness band, mobile phone, or in a device dedicated to providing haptic feedback. According to an aspect, the haptic actuator 116 is illustrative of a vibration motor, such as an eccentric rotating mass vibration motor (ERM) or a linear resonant actuator (LRA), this is operative to generate a force (e.g., haptic output 204) in response to receiving a trigger. For example, the trigger may include information associated with haptic output characteristics for the haptic actuator 116 to generate, which may vary in pattern (e.g., two short pulses versus one short and one long pulse), intensity (e.g., light vibration versus a strong vibration), location (e.g., where on the device 104, 134 the haptic output is felt, type (e.g., vibration versus a tap), and length (e.g., duration of a vibration or tap). By providing haptic feedback for alerting the user of 102 meta-information items 122, additional data are not added to the audio stream, which can be distracting to the user 102. Accordingly, the user 102 is enabled to be notified of meta-information item 122 without being distracted or without interfering with the user's consumption of narrated content, thus improving the user's experience with the device and with content narration.

According to an aspect and as illustrated in FIGS. 3A-3F, upon receipt of haptic feedback 204, the user 102 is enabled to perform an action to request additional information associated with a last meta-information item 122 encountered. For example, when haptic feedback 204 associated with meta-information is provided, the user 102 may speak a command, select a button or displayed command, perform a gesture, etc., which is received by the haptic feedback system 128 as an indication of a request for additional information associated with the meta-information item 122, wherein the haptic feedback system 128 is operative to narrate details about the meta-information. Further, for some types of meta-information, the user 102 may be enabled to select to take an action.

Figure 3A:
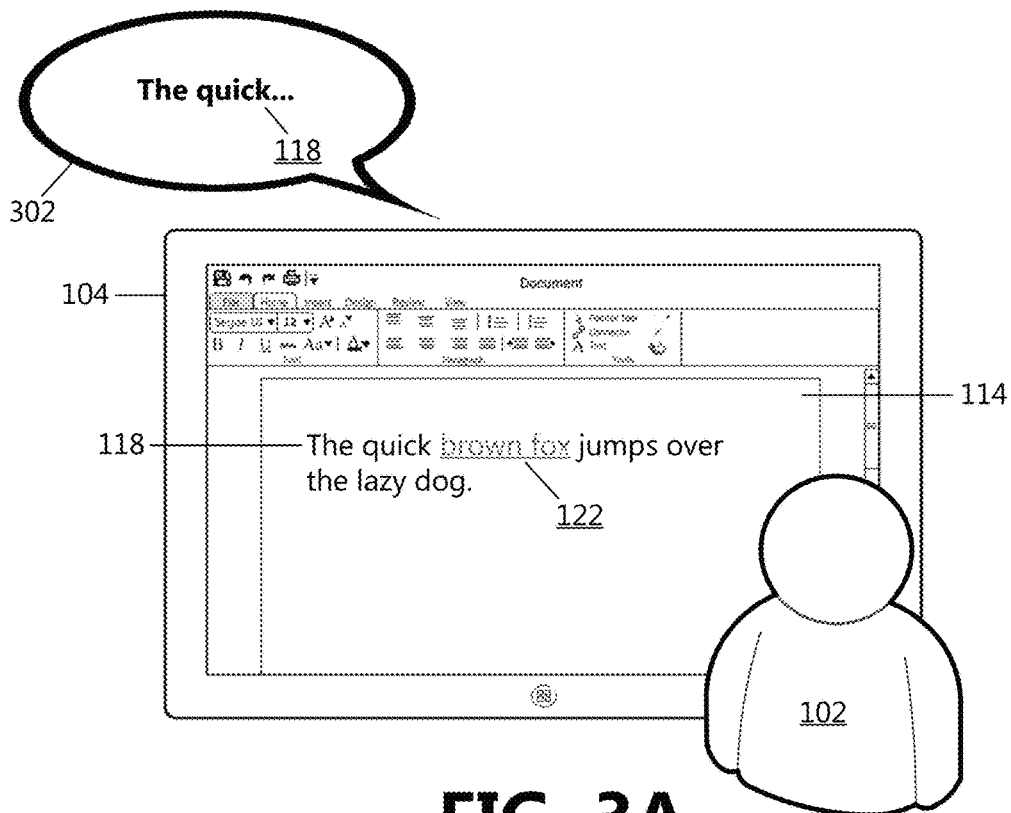
FIGS. 3A-3F illustrate an example scenario of requesting and providing additional information associated with a meta-information item.

FIGS. 3A-3F illustrate an example scenario of requesting and providing additional information associated with a meta-information item 122. With reference now to FIG. 3A, a user 102 is using a narration system 126 to narrate an example document 114. For example, the document 114 comprises textual content 118 and a meta-information item 122. FIG. 3A shows the narration system 126 generating and providing audio output 302 of the document content 118.

Figure 3B:
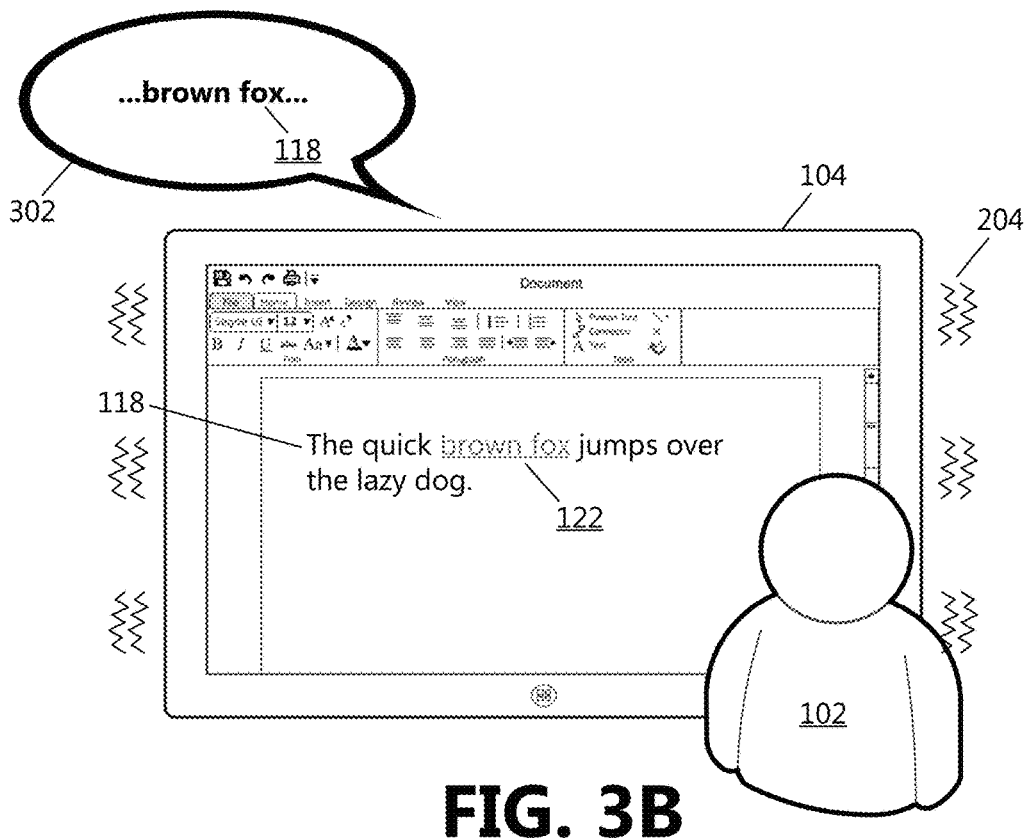

With reference now to FIG. 3B, when the narration system 126 arrives at a meta-information item 122 in the document 114, the haptic feedback system 128 triggers the haptic actuator 116 to generate and output haptic feedback 204 associated with the meta-information item 122. For example, the haptic actuator 116 generates a specific haptic output 204, such as two light vibrations, to indicate the presence of a hyperlink (meta-information item 122) as the text (content 118) of the link is narrated by the narration system 126. By providing a specific haptic output 204, for example, an output specific to a hyperlink, the haptic feedback system 128 is enabled to unobtrusively communicate more information than simply an alert to the presence of a meta-information item 122. Instead, the haptic feedback system 128 is enabled to provide enriched information, such as a type of meta-information item 122 that is included in the document 114, which may be used by the user 102 in making a decision on whether to request additional information on each piece of meta-information.

Figure 3C:
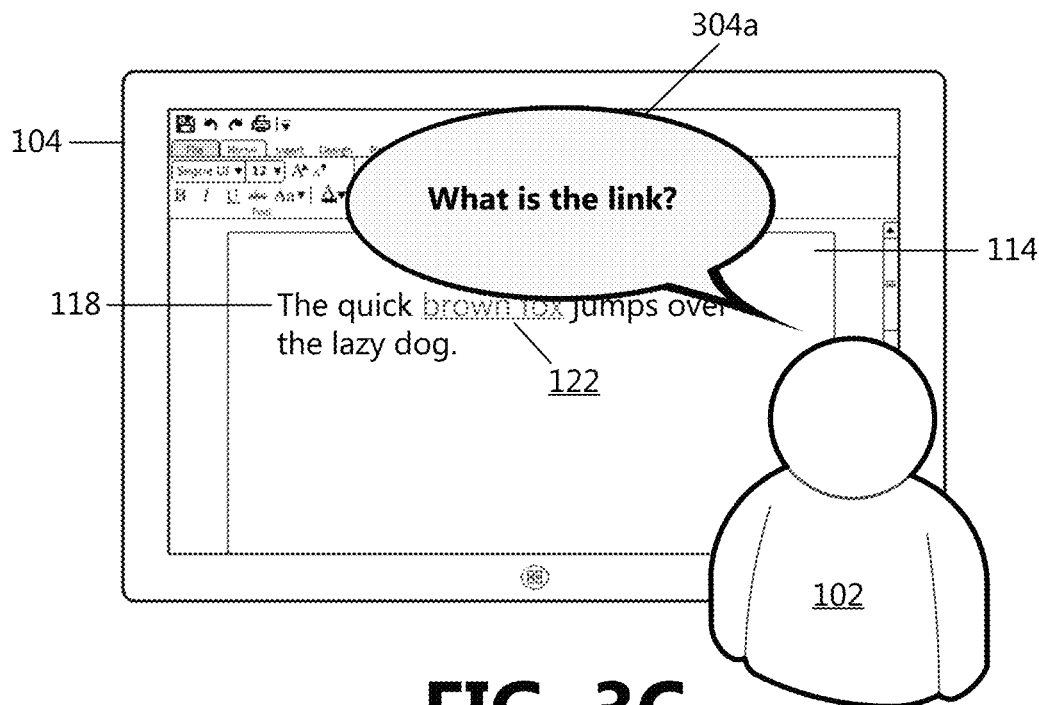

With reference now to FIG. 3C, the user 102 performs an action (e.g., provides a request 304) for additional information about the hyperlink (meta-information 122). In one example and as illustrated in FIG. 3C, the user 102 may speak aloud the request 304a, "what is the link?" In another example (not illustrated), the user may press one or more buttons or keyboard shortcuts to pause narration (audio output 302), and request additional information associated with the meta-information 122.

Figure 3D:
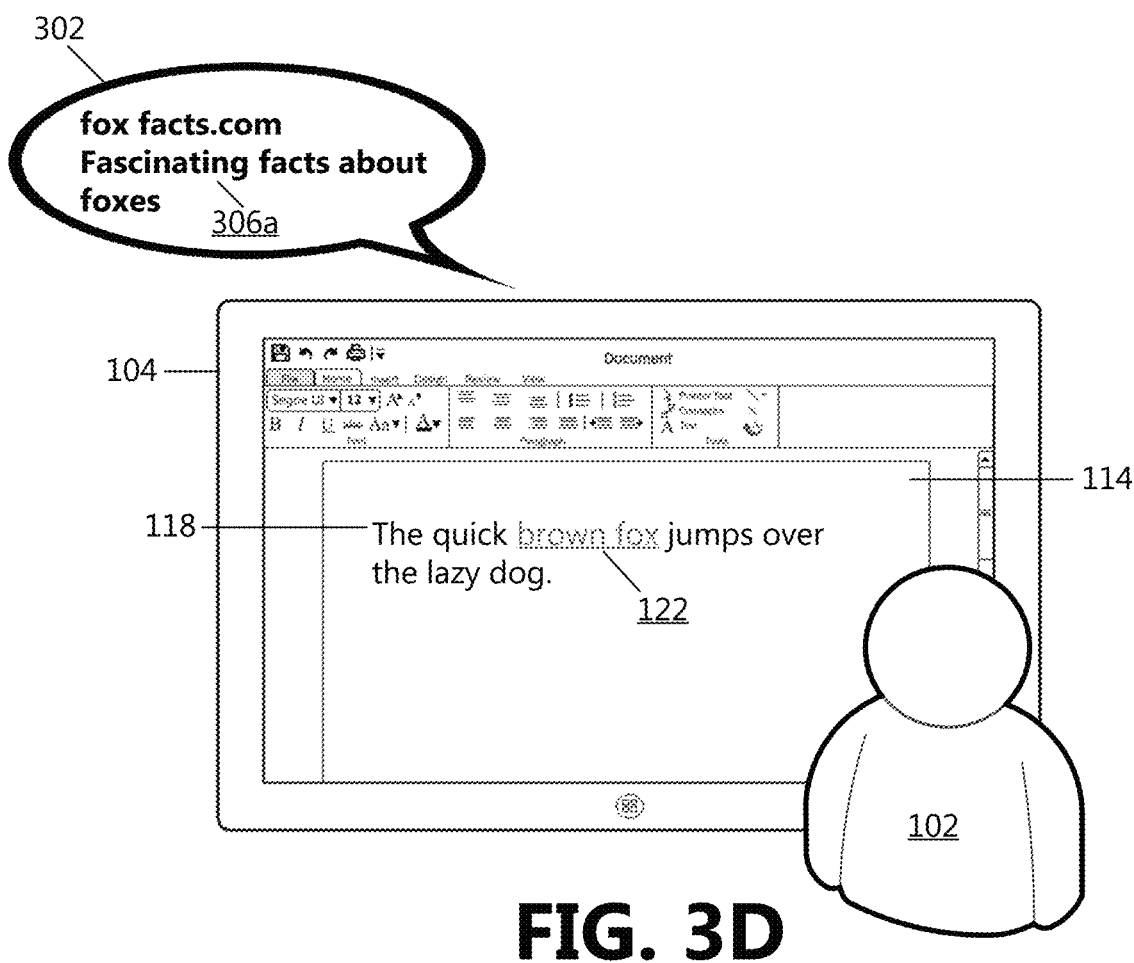

With reference now to FIG. 3D, responsive to the request 304a, the narration system 126 provides audio output 302 of a first level of incremental additional information 306a associated with the meta-information 122. According to an aspect, the application 130 is operative to provide a summary or provide a condensed version of additional information 306 associated with a meta-information item 122. In the illustrated example, the narration system 126 provides audio output 302 of the uniform resource locator (URL) that the hyperlink points to and/or a preview snippet of meta description data (e.g., title, description) that represents and describes the website. For example, meta descriptions are commonly used on search engine result pages to display preview snippets for a given page. According to an aspect, the first level of additional information 306a may include more or less information.

Figure 3E:
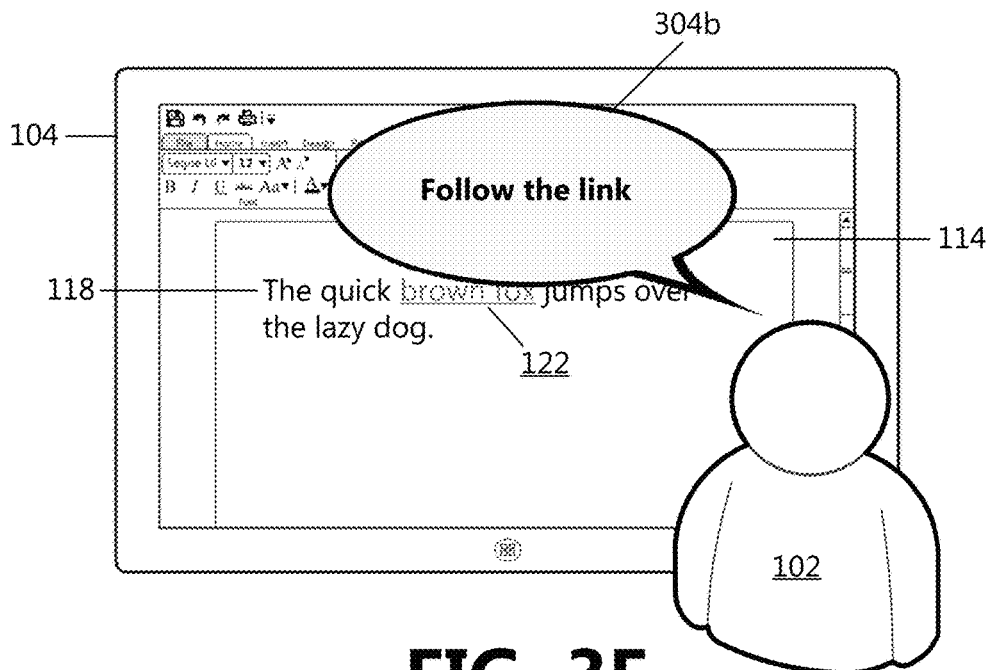

The user 102 may then choose a subsequent action, such as to continue listening to the textual content 118 narration (audio output 302), or to provide a second request 304b for a next incremental level of additional information 306b. As illustrated in FIG. 3E, the user 102 provides a second request 304b for the next incremental level of additional information 306b. In the illustrated example, the second request 304b for the next incremental level of additional information 306b is a request to "follow the link."

Figure 3F:
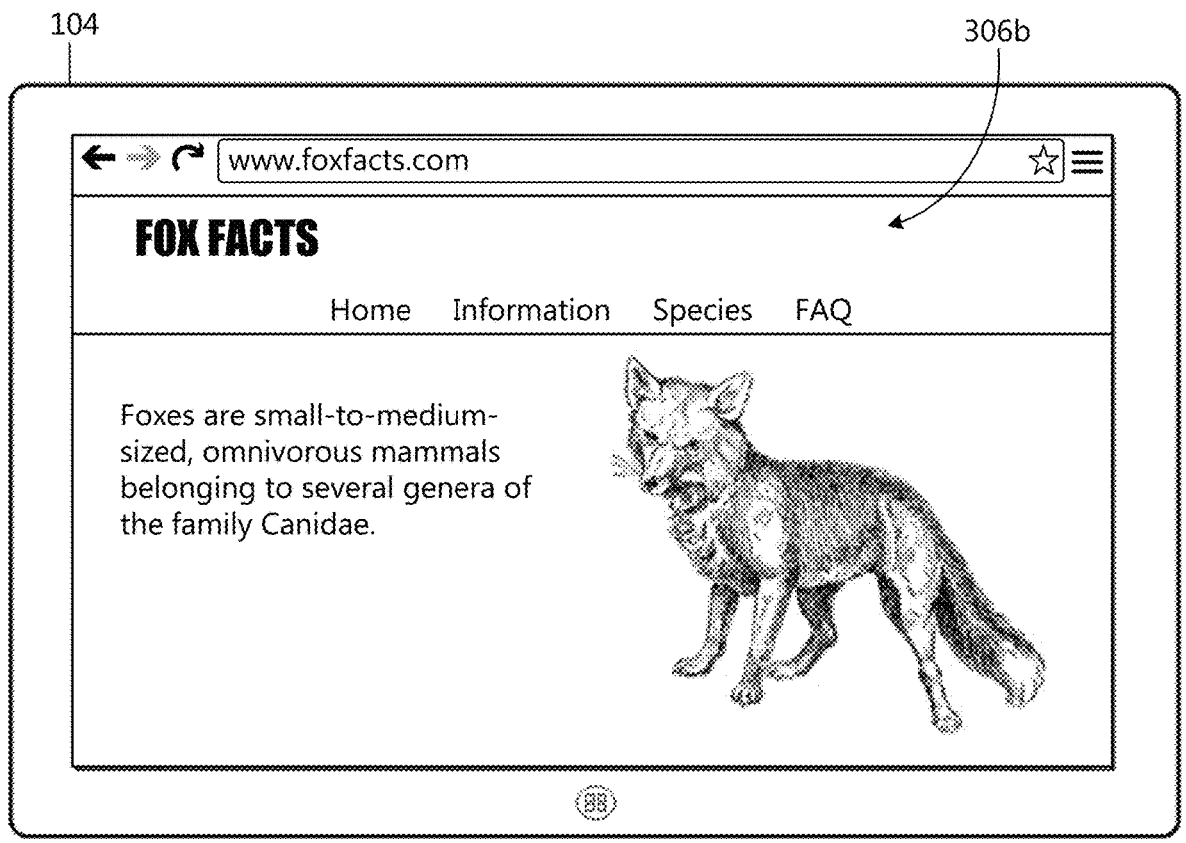

With reference now to FIG. 3F, responsive to the second request 304b, the hyperlink (e.g., meta-information item 122) is activated, and an appropriate application 130 generates a request to follow the hyperlink to the linked web page, providing the user 102 with the next incremental level of additional information 306b. As can be appreciated, other types of meta-information items 122 may have different possible actions. For example, meta-information embodied as a spelling error may provide an action to correct the error with one or more suggested replacements. As another example, meta-information embodied as a footnote identifier may provide an action to read a referenced note. According to aspects, by providing haptic feedback 204 for meta-information items 122, the user 102 is enabled to be incrementally informed of additional available information an unobtrusive manner, and is further enabled to take action on the additional available information.

Figure 4:
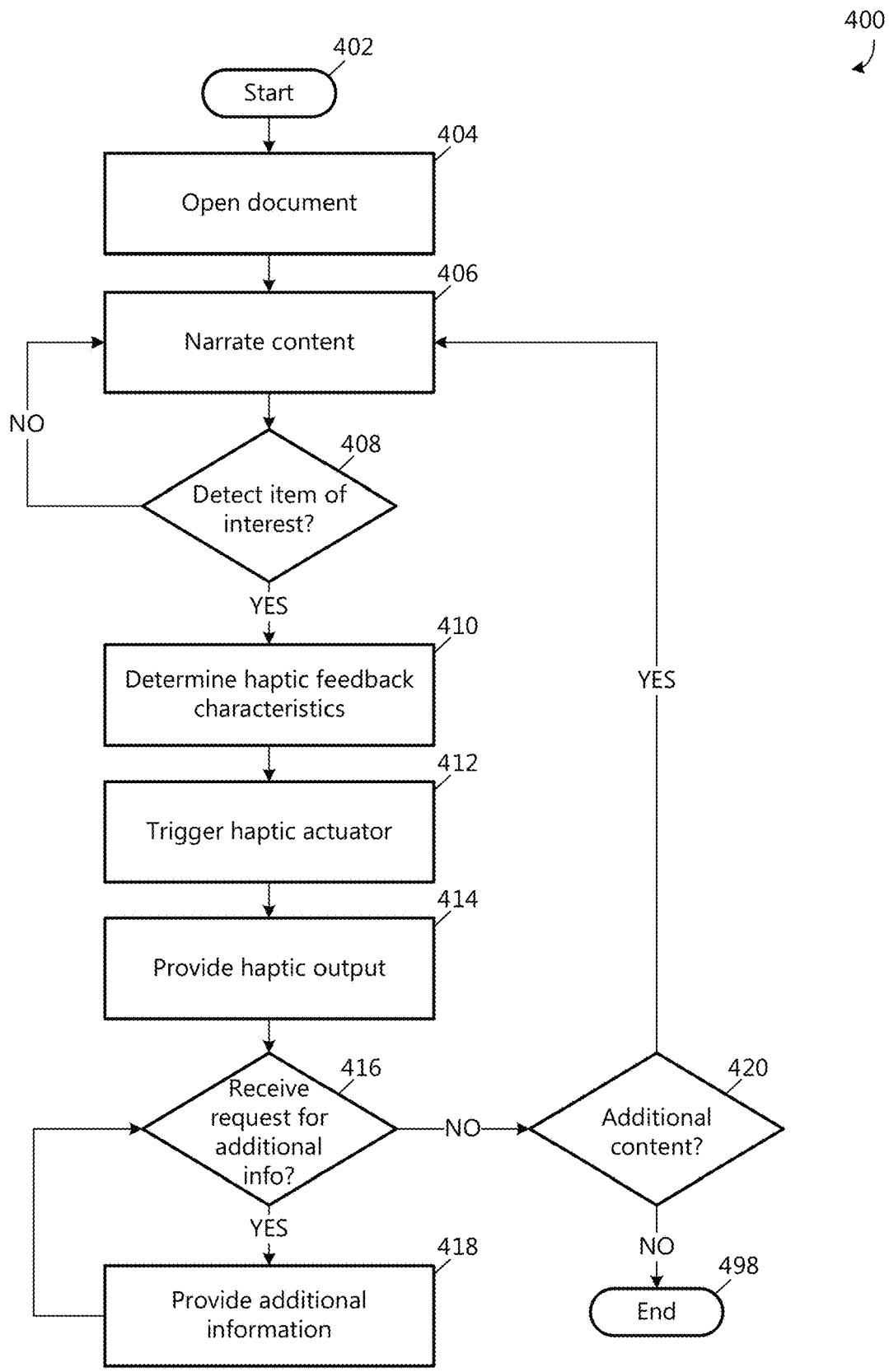
FIG. 4 is a flow chart showing general stages involved in an example method for providing haptic feedback for communication of relevant information.

Having described an operating environment 100 and various aspects of the haptic feedback system 128 with respect to FIGS. 1-3F, FIG. 4 is a flow chart showing general stages involved in an example method 400 for providing haptic feedback for communication of relevant information. With reference now to FIG. 4, the method 400 begins at start OPERATION 402, and proceeds to OPERATION 404, where a user 102 selectively opens a document 114 in an application 130. According to examples, the document 114 comprises content 118, such as textual content, audio content, video content, etc., and one or more pieces of meta-information 122 associated with a piece of content 118.

The method 400 proceeds from OPERATION 404 to OPERATION 406, where a narration system 126 is triggered to access and narrate the content 118. For example, the narration system 126 is in communication with the application 130. As the narration system 126 progresses through the content 118 in the document 114, it generates audio output 302 (e.g., text-to-speech) of the content at a current cursor location or narration point.

The method 400 continues to DECISION OPERATION 408, where a determination is made as to whether an item of interest is detected at a current narration point. In one example, as the narration system 126 progresses through and narrates the content 118, the haptic feedback system 128 analyzes each content item for determining whether the item includes an anchor in its structure indicating that it is something other than textual content 118, such as a particular type of meta-information including one of: a hyperlink, a footnote, an endnote, a cross-reference, a comment, a formatting element, tracked changes content, a spelling or grammatical error, and contextual information (e.g., a map of an address, location of additional content). In another example, meta-information 122 is stored independently of the document content 118 (e.g., a table of locations of co-authors that reference locations in the document content). Accordingly, according to this example, the haptic feedback system 128 analyzes the table for identifying an item of interest.

When a determination is made that a content item is not an item of interest (e.g., a meta-information item 122), the method 400 returns to OPERATION 406, where the narration system 126 continues to narrate the content 118, and the haptic feedback system 128 continues to analyze each content item for determining whether it is an item of interest. When a determination is made that a content item is an item of interest (e.g., a meta-information item 122), the method 400 proceeds to OPERATION 410, where the haptic feedback system 128 makes a determination to alert the user 102 about the meta-information via haptic feedback 204, and makes a determination as to what haptic feedback characteristics to apply to the haptic output. For example, the haptic feedback system 128 maps the identified type of meta-information item 122 to a haptic library 124 comprising an index of haptic feedback characteristics according to a particular type of meta-information item 122 for selecting a unique combination of haptic feedback characteristics to apply to the haptic output 204.

The method 400 continues to OPERATION 412, where the haptic feedback system 128 triggers the haptic actuator 116, which at OPERATION 414, provides the haptic output 204 according to the haptic feedback characteristics determined at OPERATION 410. According to an example, the haptic output 204 is provided substantially concurrently with the audio output 302 of the content item 118 to which the meta-information item 122 is associated is being narrated by the narration system 126.

The method 400 proceeds to DECISION OPERATION 416, where a determination is made as to whether an indication of a selection for additional information 306 associated with the meta-information item 122 is received. When a determination is made that a selection for additional content is not received, the method 400 proceeds to DECISION OPERATION 420, where the narration system 126 continues to narrate the document 114 by returning to OPERATION 406 or concludes at OPERATION 498 depending on the presence of additional content to narrate. When a determination is made that an indication of a selection for additional content is received, such as when the user 102 speaks or selects a command to act on the meta-information item 122, the method 400 proceeds to OPERATION 418, where the narration system 126 is triggered to narrate additional information 306 associated with the meta-information item 122. For example, the narration system 126 may read a referenced footnote, read a preview snippet of meta description data (e.g., title, description) that represents and describes a website to which a hyperlink points, provide information notifying the user 102 that a word is misspelled and suggested replacements from which the user 102 is enabled to select to correct the spelling error, or provide information notifying the user 102 of a grammatical error and suggested corrections from which the user 102 is enabled to select to correct the grammatical error. Other examples are within the scope of the present disclosure.

The method 400 returns to DECISION OPERATION 416 for determining whether a selection for additional information is received. When a determination is made that a request for additional information 306 associated with the meta-information 122 is received, the method 400 continues to OPERATION 418, where a next incremental level of additional information 306 is provided to the user 102. When a determination is made that a selection for additional information is not received, the method 400 continues to DECISION OPERATION 420, where a determination is made as to whether there is additional content 118 in the document 114 to analyze for identifying meta-information 122. When a determination is made that there is additional content 118 in the document 114 to analyze for identifying meta-information 122, the method 400 returns to OPERATION 406. When a determination is made that there is not additional content 118 to analyze for identifying meta-information 122, the method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
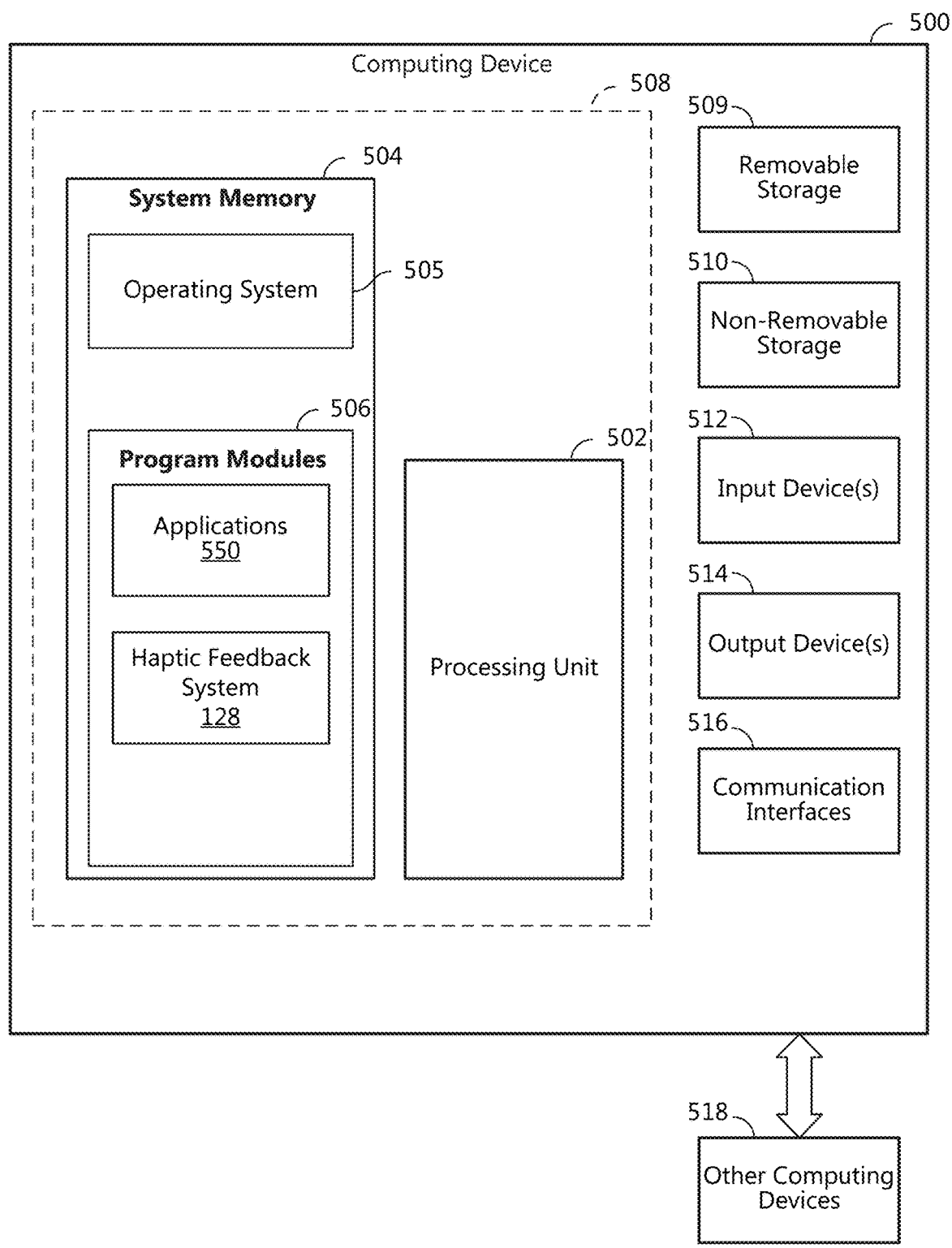
FIG. 5 is a block diagram illustrating example physical components of a computing device.
Figure 6A:
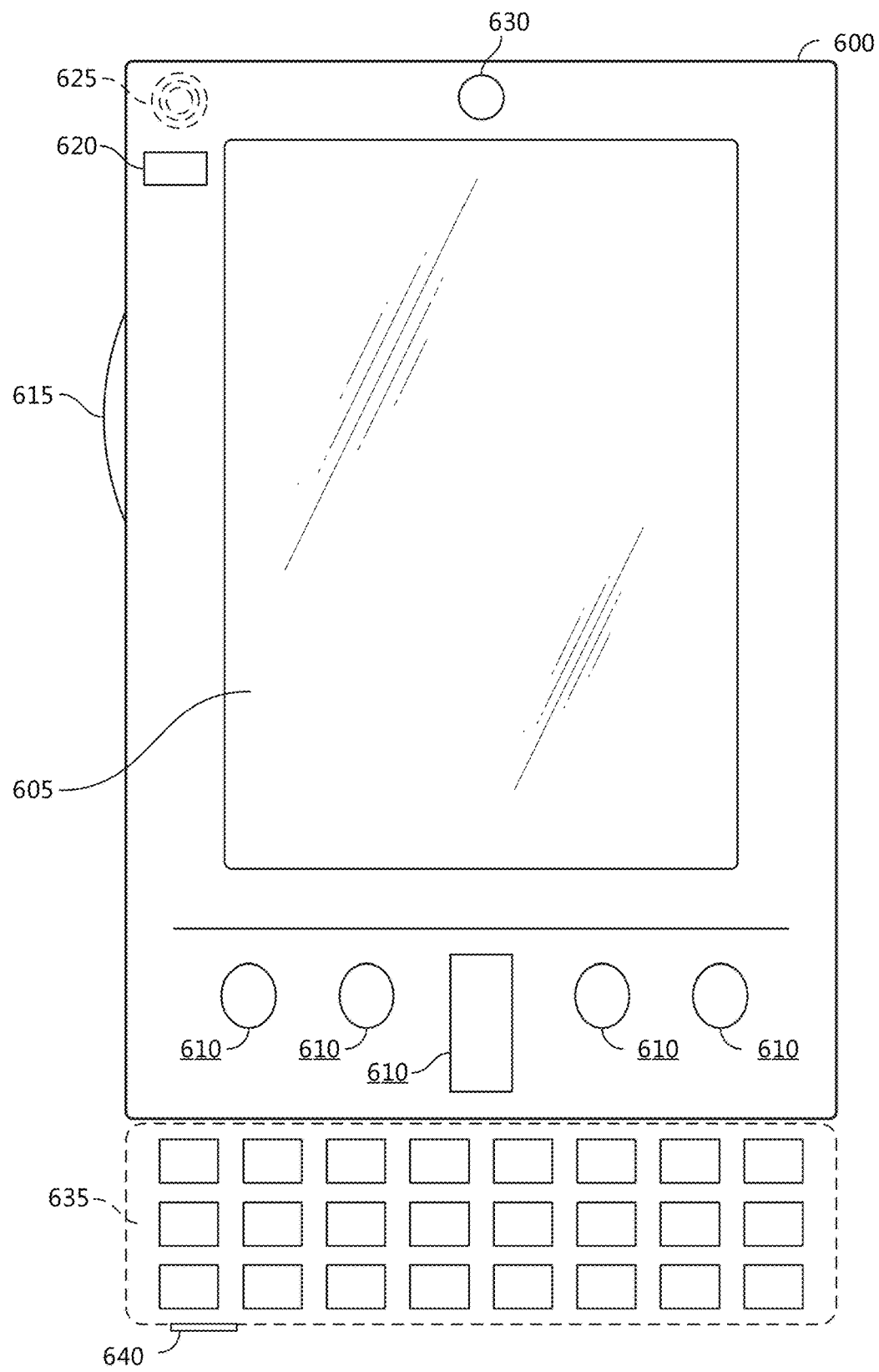
FIGS. 6A and 6B are block diagrams of a mobile computing device.
Figure 6B:
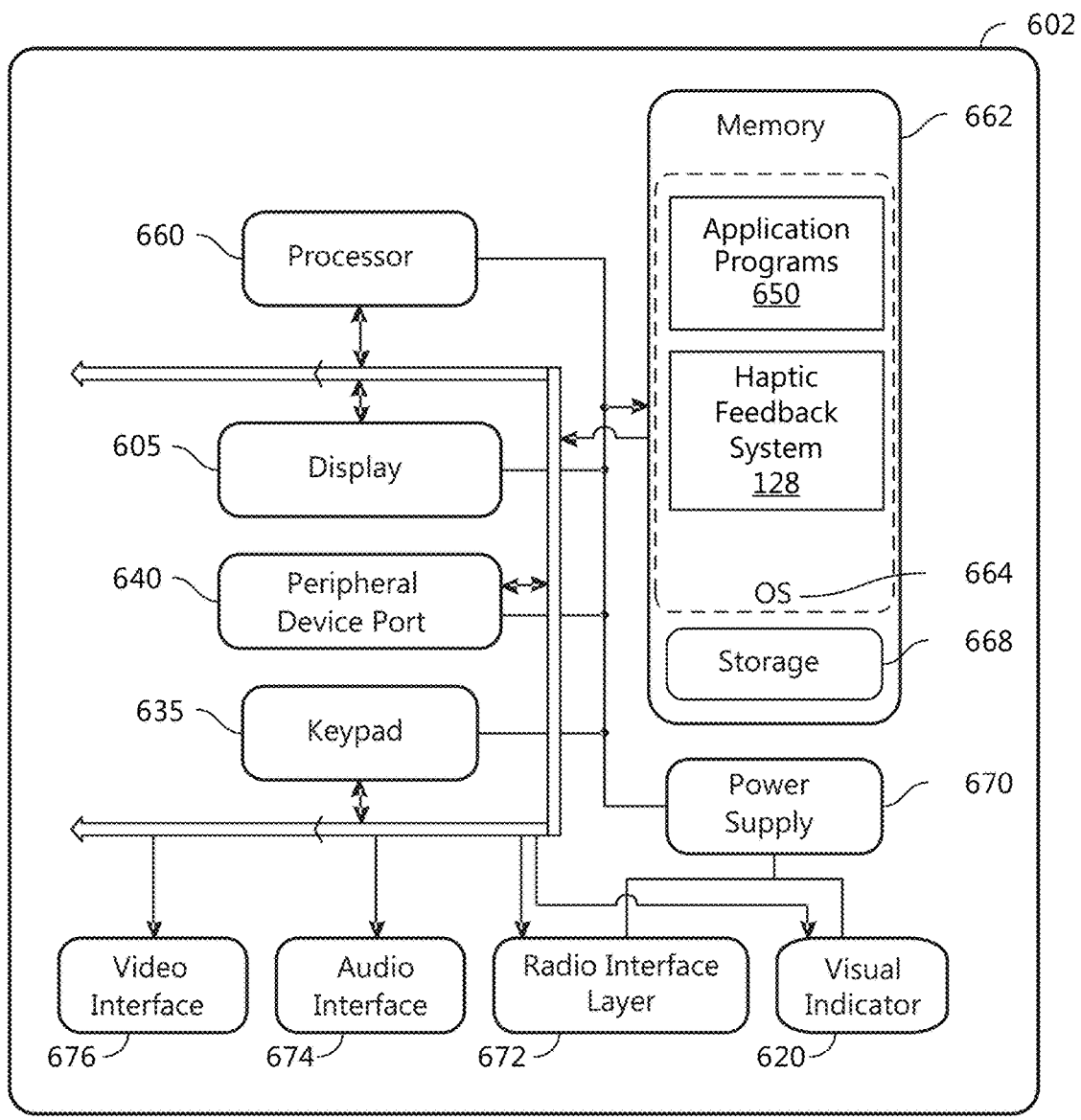
Figure 7:
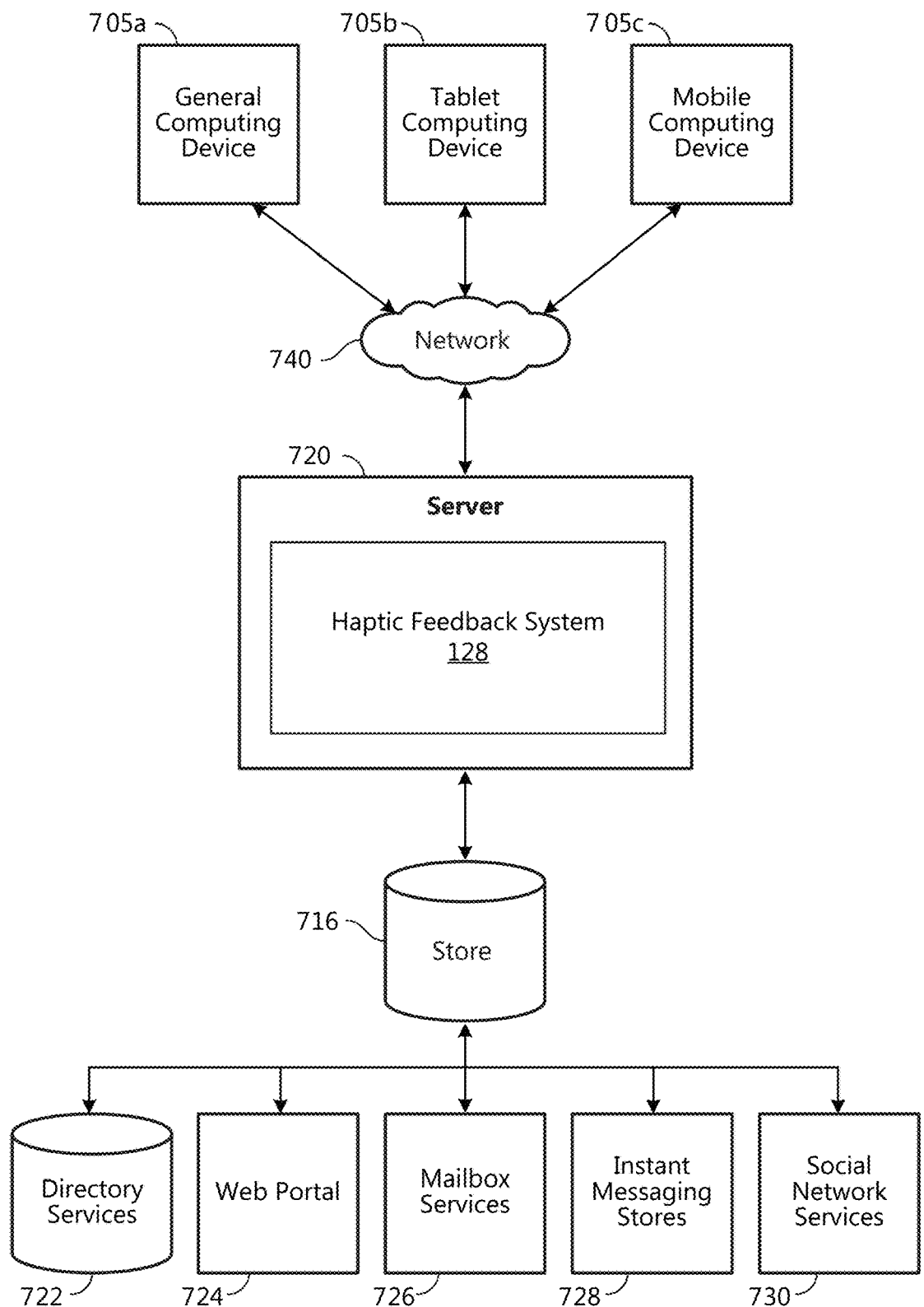
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the haptic feedback system 128. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., haptic feedback system 128) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the haptic feedback system 128 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing haptic feedback for communication of relevant information as described above. Content developed, interacted with, or edited in association with the haptic feedback system 128 is enabled to be stored in different communication channels or other storage types. For example, various documents may be stored using a directory service 722, a web portal 724, a mailbox service 726, an instant messaging store 728, or a social networking site 730. The haptic feedback system 128 is operative to use any of these types of systems or the like for providing haptic feedback for communication of relevant information, as described herein. According to an aspect, a server 720 provides the haptic feedback system 128 to clients 705a,b,c. As one example, the server 720 is a web server providing the haptic feedback system 128 over the web. The server 720 provides the haptic feedback system 128 over the web to clients 705 through a network 710. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing concurrent haptic communication of relevant information when narrating a document, comprising:
opening a document comprising content, the document presented on a display of a computing device;
triggering a narration system to generate and provide audio output of the content to narrate the document;
detecting a meta-information item at a current narration point in the document, wherein information relevant to the content at the current narration point is associated with the meta-information item, and the meta-information item is of a first type among a plurality of types;
based on the first type of the meta-information item detected, determining one or more haptic feedback characteristics specific to the first type;
responsive to the detection of the meta-information item, triggering a haptic actuator to:
generate haptic feedback having the one or more haptic feedback characteristics specific to the first type; and
provide the haptic feedback concurrently with the audio output of the content at the current narration point to indicate a presence of the information relevant to the content at the current narration point, wherein the haptic feedback is provided at a location around one or more portions of the display of the computing device corresponding to a position of the meta-information item within the document presented on the display of the computing device;
responsive to generating and providing the haptic feedback, receiving an indication of a selection for the information relevant to the content at the current narration point; and
triggering the narration system to generate and provide audio output of the information relevant to the content at the current narration point.

2. The computer-implemented method of claim 1, wherein when the meta-information item is embodied as a hyperlink, triggering the narration system to generate and provide the audio output of the information relevant to the content at the current narration point comprises triggering the narration system to generate and provide audio output of a uniform resource locator (URL) of a website to where the hyperlink points.

3. The computer-implemented method of claim 2, wherein when the meta-information item is embodied as the hyperlink, triggering the narration system to generate and provide the audio output of the information relevant to the content at the current narration point comprises triggering the narration system to generate and provide audio output of a preview snippet of meta description data that represents and describes the website to where the hyperlink points.

4. The computer-implemented method of claim 3, wherein triggering the narration system to generate and provide the audio output of the preview snippet of meta description data that represents and describes the website to where the hyperlink points comprises triggering the narration system to generate and provide audio output of a title of the website and a description of the website.

5. The computer-implemented method of claim 4, wherein responsive to generating and providing the audio output of the information relevant to the content at the current narration point:
receiving an indication of a selection to navigate to the website; and
triggering an appropriate application to navigate to the website.

6. The computer-implemented method of claim 1, wherein when the meta-information item is associated with a footnote, triggering the narration system to generate and provide the audio output of the information relevant to the content at the current narration point comprises triggering the narration system to generate and provide audio output of content comprising the footnote.

7. The computer-implemented method of claim 1, wherein when the meta-information item is associated with a spelling or grammatical error, triggering the narration system to generate and provide the audio output of the information relevant to the content at the current narration point comprises triggering the narration system to generate and provide audio output of the error and one or more suggested replacements or corrections.

8. The computer-implemented method of claim 1, wherein:
the meta-information item is stored outside the document; and
detecting the meta-information item comprises analyzing a table for identifying a co-author's location in the document.

9. The computer-implemented method of claim 1, wherein detecting the meta-information item comprises analyzing a piece of content associated with the meta-information item for determining whether its structure indicates that the piece of content is not textual content.

10. The computer-implemented method of claim 9, further comprising:
identifying the meta-information item as one from a group comprised of:
a hyperlink;
a footnote;
an endnote;
a cross-reference;
a comment;
a formatting element;
a tracked changes content;
a spelling error;
a grammatical error; and
contextual information.

11. The computer-implemented method of claim 1, wherein the one or more haptic feedback characteristics specific to the first type include:
a haptic output pattern;
a haptic output intensity;
a haptic output location; and
a length of haptic output.

12. The computer-implemented method of claim 1, wherein providing the haptic feedback at the location around the one or more portions of the display of the computing device corresponding to the position of the meta-information item within the document presented on the display of the computing device comprises providing the haptic feedback at a location around the one or more portions of the display of the computing device relative to a general direction of additional content to indicate to a user in which direction in the document the additional content is available to navigate.

13. A system for providing concurrent haptic communication of relevant information when narrating a document, the system comprising a computing device, the computing device comprising:
at least one processing device; and
at least one nonvolatile computer readable data storage medium storing instructions that, when executed by the at least one processing device, cause the computing device to:
open a document comprising content, the document presented on a display of the computing device;
trigger a narration system to generate and provide audio output of the content to narrate the document;
detect a meta-information item at a current narration point in the document, wherein information relevant to the content at the current narration point is associated with the meta-information item, and the meta-information item is of a first type among a plurality of types;
based on the first type of the meta-information item detected, determine one or more haptic feedback characteristics specific to the first type;
responsive to the detection of the meta-information item, trigger a haptic actuator to:
generate haptic feedback having the one or more haptic feedback characteristics specific to the first type; and
provide the haptic feedback concurrently with the audio output of the content at the current narration point to indicate a presence of the information relevant to the content at the current narration point, wherein the haptic feedback is provided at a location around one or more portions of the display of the computing device corresponding to a position of the meta-information item within the document presented on the display of the computing device;
responsive to generating and providing the haptic feedback, receive an indication of a selection for the information relevant to the content at the current narration point; and
trigger the narration system to generate and provide audio output of the information relevant to the content at the current narration point.

14. The system of claim 13, wherein:
the meta-information item is a hyperlink; and
to generate and provide the audio output of the information relevant to the content at the current narration point, the computing device is further operative to trigger the narration system to generate and provide audio output of:
a uniform resource locator (URL) of a website to where the hyperlink points; and
a preview snippet of meta description data that represents and describes a title of the website and a description of the website to where the hyperlink points.

15. The system of claim 14, wherein responsive to generating and providing the audio output of the information relevant to the content at the current narration point, the computing device is further operative to:
receive an indication of a selection to navigate to the website; and
trigger an appropriate application to navigate to the website.

16. The system of claim 13, wherein detecting the meta-information item comprises analyzing a piece of content associated with the meta-information item for determining whether its XML structure indicates that the piece of content is not textual content.

17. Computer storage media including computer readable instructions, which when executed by a processing unit is operative to:
open a document comprising content, the document presented on a display of a computing device;
trigger a narration system to generate and provide audio output of the content to narrate the document;
detect a meta-information item at a current narration point in the document, wherein information relevant to the content at the current narration point is associated with the meta-information item, and the meta-information item is of a first type among a plurality of types;
based on the first type of the meta-information item detected, determine one or more haptic output characteristics specific to the first type;
responsive to the detection of the meta-information item, trigger a haptic actuator to:
generate haptic output having the one or more haptic output characteristics specific to the first type; and
provide the haptic output concurrently with the audio output of the content at the current narration point to indicate a presence of the information relevant to the content at the current narration point, wherein the haptic output is provided at a location around one or more portions of the display of the computing device corresponding to a position of the meta-information item within the document presented on the display of the computing device;

responsive to generating and providing the haptic output, receive an indication of a selection for the information relevant to the content at the current narration point; and trigger the narration system to generate and provide audio output of the information relevant to the content at the current narration point.

\* \* \* \* \*